Oct. 30, 1956  J. H. DEBS  2,768,765
MULTIPLE BAKING PAN ASSEMBLY AND BRIDGING MEMBER FOR SAME
Filed May 14, 1954
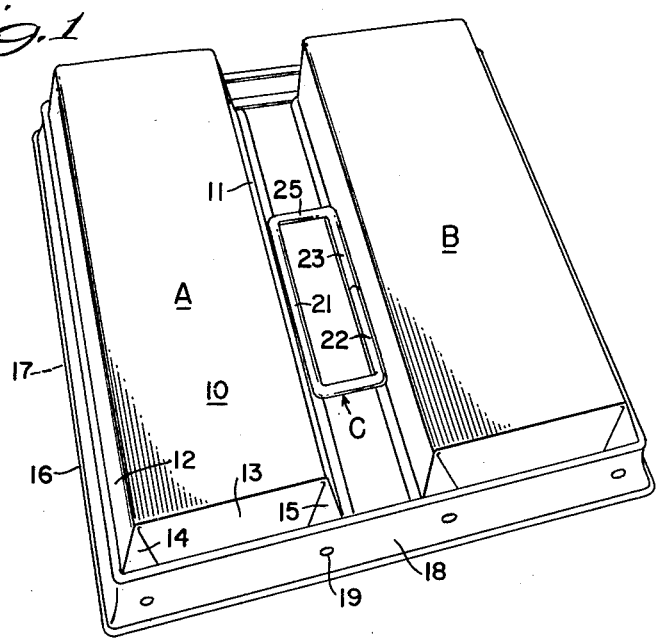
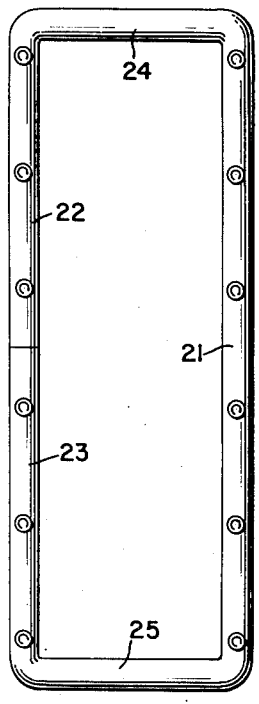
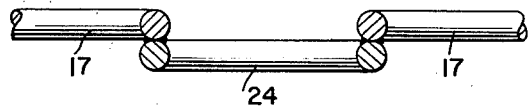
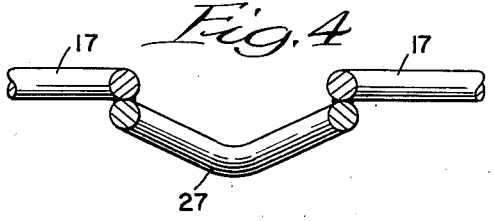
INVENTOR:
Jerome H. Debs,
BY
Orms, McDougall, Williams & Hersh,
ATTORNEYS.

United States Patent Office 2,768,765
Patented Oct. 30, 1956

2,768,765

MULTIPLE BAKING PAN ASSEMBLY AND BRIDGING MEMBER FOR SAME

Jerome H. Debs, Chicago, Ill., assignor to Chicago Metallic Manufacturing Company, Chicago, Ill., a corporation of Illinois Application May 14, 1954, Serial No. 429,733

4 Claims. (Cl. 220—23.2)

This invention relates to baking pans and more particularly to baking pans which are joined into units for use commercially with automatic machines for the manufacture of baked products.

It is an object of this invention to produce a multiple baking pan assembly of the type described which is adapted for more efficient use with automatic machines in baking and which is improved with respect to its strength, sanitation and possibilities of injury of equipment and by the equipment with which such assemblies are used.

These and other objects and advantages of this invention will hereinafter appear and for purposes of illustration, but not of limitation, an embodiment of the invention is shown in the accompanying drawing in which—

Figure 1 is a perspective elevational view from the bottom side of a baking pan assembly embodying features of this invention;

Figure 2 is a plan view of the spacer element shown in Figure 1;

Figure 3 is an end elevational view of the spacer element shown in Figure 2, and Figure 4 is an end elevational view of a modified form of the spacer element shown in Figure 1.

In my copending application Ser. No. 293,286, filed June 13, 1952, now abandoned, of which this application is a continuation-in-part, description is made of a unitary assembly comprised of a plurality of baking pans secured one to the other in closely spaced apart parallel relation both in crosswise and lengthwise rows with spacer elements therebetween which, in the area spanning the spacer between adjacent pans, is curvilinear in section to militate against the accumulation of dirt and to avoid the existence of edges and surfaces upon which contamination may collect or injury result as an incidence to normal use. For securing the rounded spacer elements to the walls of adjacent pans in the set, the ends of the spacer elements are formed flat for turning in the opposite direction to the walls of the pans about the reinforcing wires arranged about the upper edge of the pans.

The spacer elements in the form of single lengths of metal rod or the like have been found to be insufficient rigidly to secure the pans in the desired spaced relation in the assembly and they have been found insufficient also to serve as the means in the path of indexing fingers of the automatic baking equipment for orienting the pan set in positions for use.

The combination of forces to which the spacer elements are subjected in use have been found sufficient to cause the spacers to become distorted by an amount which may interfere with the proper operation of the equipment and with the proper spacing of the pans. Not infrequently, the spacers also become loosened from their supports and fall into the baking machinery or into the goods being baked therein, neither of which are desirable from the standpoint of operation or from the standpoint of the final product.

The improvement embodying features of this invention resides in the use of a sanitary spacer embodying the features described in the aforementioned copending application but in which, in addition, means are embodied to provide reinforcement to the side walls of the baking pan for greater stability in use, particularly with automatic baking equipment, and which also embodies means to prevent inadvertent displacement of the spacer in use and thereby to avoid removal and loss into the equipment or into the baked goods.

The invention herein will be illustrated by the construction of a multiple baking pan assembly for use in the production of baked goods wherein the pan units are of substantially rectangular cross section formed with side walls all around to limit crust formation chiefly to the top side of the baked product. It will be understood that the concepts of this invention are also applicable to other similar constructions in baking pan assemblies for use with or without automatic equipment in the preparation of baked goods.

As shown in Figure 1, a baking pan assembly embodying features of this invention is illustrated by two separate baking pans A and B of substantially identical construction and contour. These pan units are formed of a flat or stippled sheet of metal formed to rectangular shape having bottom walls 10, side walls 11 and 12 joined by end walls 13. The excess metal remaining upon folding the sheet metal to the desired rectangular shape is lapped over the end walls to provide reinforcing flaps 14 and 15 which function to increase the strength and rigidity of the structure in a manner which permits economy and simplicity to be employed in manufacturing operations.

The upper edge portions of the sheet metal forming the side and end walls of each baking pan unit are rolled over to form a rounded bead 16 about a reinforcing wire 17 which extends all around the upper edge of each pan. Generally, the walls of the baking pan are formed with an incline extending outwardly from the lower edge to permit stacking of the units one upon another in nesting relation and to facilitate the removal of the baked goods from the pan as by inversion or the like.

Pan units are united into a unitary assembly by rigid straps 18 secured by rivets 19 through reinforcing flaps 14 and 15. Straps encircling set consist of two pieces, the ends of which are butted together at sides of set. The ends of these straps are secured by rivets to a small rivet plate the top edge of which is curled around pan wire 16 at sides of set. The strap members function to reinforce the pan units and to protect the walls of the pans against injury in response to impact and the like while also imparting rigidity to the pans while holding them in assembled relation. For a more detailed description of the strap assembly, reference may be made to the Langel Patent No. 2,347,694, issued May 2, 1944.

Instead of a single rod-like spacer of the type described in my aforementioned copending application, use is made of a spacer member in the form of an elongate rod C of circular cross section which is bent to rectangular shape having a length defined by the mid-section 21 and end sections 22 and 23 of the rod in parallelism which is less than the length of adjacent pans in the set and a width defined by the intermediate portions 24 and 25 of the rod turned at right angles between the end sections and the mid-sections, which corresponds to the distance between the rims 16 of adjacent pans so that the elongate mid and end sections will be located beneath the rims of the pans when in position of use. The end sections 22 and 23 of the rod forming one of the elongate legs of the rectangle are aligned in end to end relation and are fixed one to the other in the central portion as by welding.

In its preferred position of use, the rectangular spacer C is positioned midway between the ends of the pans with the elongate sections 21 and 22—23 underlying the rims of the pans which are offset outwardly from the side walls. The elongate sections are secured to the rims throughout the lengths thereof as by spot welding at closely spaced apart points 26 or by other metal joining means which secure the elements in surface contact with each other in at least a number of points throughout their lengths.

Under such circumstances, the spacer member does not interfere with the continuity or contour of the bead formed by turning the side walls of the pans about the reinforcing wires extending continuously about the upper edge of the pans, yet the spacer is securely fixed to the assembly in a manner which exposes only the rounded spreader sections 24 and 25 extending crosswise between the pans and into the path for engagement by indexing fingers of automatic baking machines. Attachment of the rectangular spacer member C to the pan elements and forming an integral part thereof through a substantial length of the central portion reinforces and stiffens the pans in the set better to resist deformation or distortion by automatic machines which handle the pans in use.

The spreader portions 24 and 25 of the spacer disposed crosswise between adjacent pans may be formed straight for conventional use as shown in Figure 3 or may be formed with a curvilinear or V shape having its apex 27 in the mid-portion extending downwardly to clear depanner bars of automatic machines as illustrated in Figure 4.

In practice, the rectangular spacer members may be preformed into rectangular sections, as illustrated in Figure 2, with projections 28 extending upwardly from the top surface thereof for convenience in welding to the underside of the rim overlying the portions thereof in position of use.

It will be apparent from the foregoing description that I have provided an improved spacer means for securing multiple pans in a baking pan assembly in the desired spaced relation between the pans and in a manner which not only reinforces the side walls of the pans to resist distortion in use but in which means are provided for more efficient operation in combination with the indexing means of automatic baking equipment for positioning the pans in use.

My improved spacer elements embody the improvements wherein a rounded member only is exposed to the elements which might otherwise cause contamination in the event that they were permitted to collect on the surfaces of the spacers as was heretofore possible with the flat spacer bands previously employed.

It will be apparent that numerous other advantages are available in the use of spacer elements of the type described in combination with baking pan assemblies, such for example as reinforcement and rigidity of the side walls of the baking pan coupled with maintenance of a desired spaced relation between the walls without interference with the contour of the pan formed by the beaded section about the upper edge thereof and with markedly lesser possibilities of displacement of the spacer elements as was heretofore possible to interfere with or damage baking equipment with which pan assemblies of the type described are used or to contaminate products baked therein.

It will be understood that spacer elements of the type described may be used with multiple baking pan assemblies having different arrangements between the pans and that the spacer elements may be formed of rod-like members of different cross section which are not flat across the top surface, and that other changes may be made in the details of construction, arrangement and operation without departing from the spirit of the invention, especially as defined in the following claims.

I claim:

1. A multiple baking pan assembly formed of a plurality of substantially rectangular baking pan units joined together in spaced-apart relation, a reinforcing wire extending all around the upper edge portion of each pan unit with the upper edge portion of the pan wall being turned about the wire to form a reinforcing bead, a bridging member for maintaining the desired spaced relation between intermediate portions of said adjacent pans comprising a metal frame formed of a rod of circular cross-section bent to form a loop of rectangular shape having spaced side portions dimensioned to have a length less than the length of the pans and connecting end portions having a width corresponding to the spaced relation between the side walls of adjacent pans, said bridging member being secured in position of use with the longitudinal side portions underlying the beads of the adjacent pans and in contacting relation with the adjacent side walls for reinforcement and for imparting rigidity thereto with the end portions of the loop extending crosswise between the pans in longitudinally spaced-apart relation for rigidly maintaining the side walls in fixed laterally spaced-apart relation, and means for fixing the lengthwise portions of the frame members to the under side of the beads.

2. A multiple baking pan assembly as claimed in claim 1 in which the means for fixing the lengthwise side portions of the frame member to the under side of the beads comprises welds at spaced-apart points along the beads.

3. A multiple baking pan assembly as claimed in claim 1 in which the end portions extending crosswise between the pans extend linearly in the same horizontal plane between the pans.

4. A multiple baking pan assembly as claimed in claim 1 in which the end portions extending crosswise between the pans are V-shaped having their apices extending downwardly intermediately between the pans.

References Cited in the file of this patent

UNITED STATES PATENTS

| | | |
|---|---|---|
| 1,749,800 | Chandonia | Mar. 11, 1930 |
| 1,780,002 | Chandonia | Oct. 28, 1930 |
| 2,035,041 | Benson | Mar. 24, 1936 |